J. REINHARDT.
TIRE REPAIRING APPARATUS.
APPLICATION FILED OCT. 23, 1920.
1,367,626.
Patented Feb. 8, 1921.
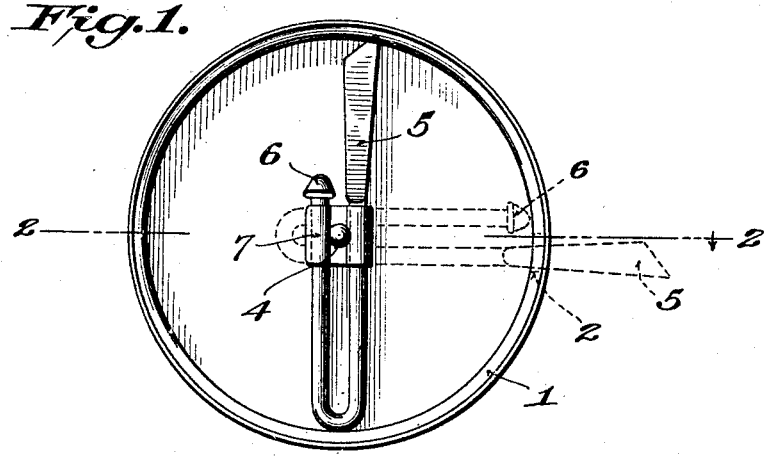
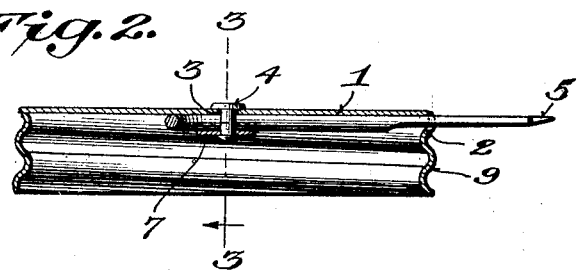
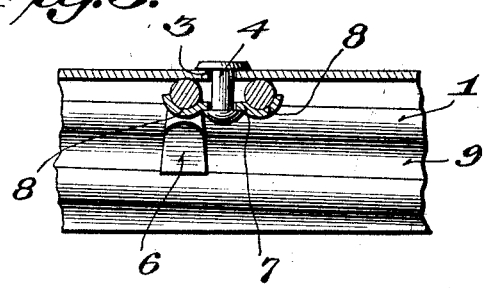
Inventor
James Reinhardt
By John M. Spellman
Attorney

UNITED STATES PATENT OFFICE.

JAMES REINHARDT, OF NORMAN, OKLAHOMA.

TIRE-REPAIRING APPARATUS.

1,367,626.  Specification of Letters Patent.  Patented Feb. 8, 1921.

Application filed October 23, 1920. Serial No. 419,059.

*To all whom it may concern:*

Be it known that I, JAMES REINHARDT, a citizen of the United States, residing at Norman, in the county of Cleveland and State of Oklahoma, have invented certain new and useful Improvements in Tire-Repairing Apparatus, of which the following is a specification.

This invention relates to certain new and useful improvements in tire repairing apparatus and relates more especially to a cutter for use in cutting tire patches.

It is customary with certain types of tire repair kits to supply a can equipped with a tube of cement and a section of patch rubber the rubber being cut according to the size of the puncture or blow-out and then applied thereto. Heretofore no provision has been made for the cutting of the patch and consequently if the motorist has no knife and happens to be in a place where he cannot obtain one, he is at an obvious disadvantage.

Accordingly, the present invention proposes to apply a cutter to the can top which cutter is normally housed within the top and can be easily and quickly projected outwardly therefrom so that the top serves as a handle during use of the cutter.

Further the invention aims to provide a cutter which is normally held by the can top so that same cannot through accident be moved to operative position, and wherein the cutter is completely housed by the can top and is reliably held against movement during the cutting operation.

Still further the invention aims to provide a simple and economical structure which can be easily applied to the can top.

In the drawings:

Figure 1, is a bottom plan view of a can top with the invention applied thereto.

Fig. 2, is a section on line 2—2 of Fig. 1; and

Fig. 3, is an enlarged section on line 3—3 of Fig. 2.

In proceeding in accordance with the present invention, the can top 1 with which the repair-kit cans aforementioned are supplied, is modified merely to the extent of forming a slot 2 in the rim or peripheral wall thereof, the slot preferably alining at one side wall thereof with the under face of the can top proper, as depicted in Fig. 2. In addition a hole 3 is formed in the top proper and at the center thereof to receive a rivet 4, which latter constitutes the sole means of attachment of the device.

The cutter may be formed of a piece of steel rod or the like and is of approximately J-shape, the rivet 4 being received in the space between the legs of the J.

The free end of the longer leg of the J-shaped member is flattened and sharpened to form a cutting point 5, while the free end of the shorter leg of the member is upset or bent or otherwise formed to provide an abutment or stop 6, which latter engages with one end of an attaching clip 7, so as to limit inward movement of the cutting member.

The clip is formed of a piece of sheet metal having a central hole to receive the rivet 4 and has its ends formed with concave seats 8 in which latter the respective legs of the J-cutting member are seated or engaged so as to be capable of sliding therein.

The cutter member and the clip are pivotally connected to the can top proper by the rivet, so that the member and therewith the clip can be swung from the full to the dotted line position of Fig. 1, or vice versa.

In operation, the cutter member normally occupies the full line position of Fig. 1, wherein the cutter 5 lies opposite to the rim 9 of the can top so as to be protected thereby and concealed. The cutter member as shown in Fig. 2 occupies but small space within the can top and therefore does not interfere with the can closing function which the top primarily has and is designed for.

When the top is removed and the patch is to be cut, the cutter member is merely swung to the dotted line position of Fig. 1, so that the cutter proper 5 registers with the slot 2, whereupon the member is slid to the position of Fig. 1, dotted lines and Fig. 2 full lines, the cutter moving through the slot 2. It will now be seen that the can top serves as a handle and that the end walls of slot 2 will hold the cutter against movement during the cutting action. When the parts are to be restored to normal, the cutter is slid inwardly and then turned to again bring its point opposite to an imperforate part of the rim 9.

From the foregoing it will be seen that the device is economical in production easy and quick to assemble, since but a single rivet is required, and is easy and quick in operation, and assures the presence of a cutter at all times with the repair kit and one which cannot be lost or misplaced unless the can top itself is lost or misplaced.

What is claimed is:

1. In combination with a can top having a slot in the rim thereof, a J-shaped cutter having a cutting part formed on one free end thereof and having an abutment formed on the opposite free end, a clip having concave seats for the respective legs of the cutter to slidably support said legs, and a rivet for pivotally securing the clip to the under face of the can top, the cutting part being movable through the slot and normally disposed opposite to and within the rim interior.

2. In combination with a can top having a slot in the rim thereof, a cutter, and means to mount the cutter to allow same to move through the slot in one position and in a second position to lie within the rim and be concealed thereby.

3. In combination with a can top having a rim, a cutter, and means whereby to mount the cutter so that same in one position can be projected beyond the rim and in a second position is concealed within the rim.

4. In combination with a can top having a rim and a slot in the latter, a pivoted and slidable cutter borne by the top and movable through the slot by sliding thereof and movable past the slot by pivotal action so as to be protected by the rim.

5. In combination with a can top having a slotted rim, a cutter, a pivotal support borne by the top, and means to slidably mount the cutter on the support whereby the cutter may be moved through the slot and withdrawn into the rim and then turned to lie opposite an imperforate part of the rim.

6. In combination with a can having a removable top, a cutter, means to mount the cutter so that same may be projected beyond the periphery of the top and to lie within the periphery and means to hold the cutter against lateral movement when in projected position.

7. In combination with a can top having a slotted rim, a cutter borne by the top and slidable through the slot, so as to lie exteriorly of and beyond the rim.

In testimony whereof I affix my signature.

JAMES REINHARDT.